UNITED STATES PATENT OFFICE.

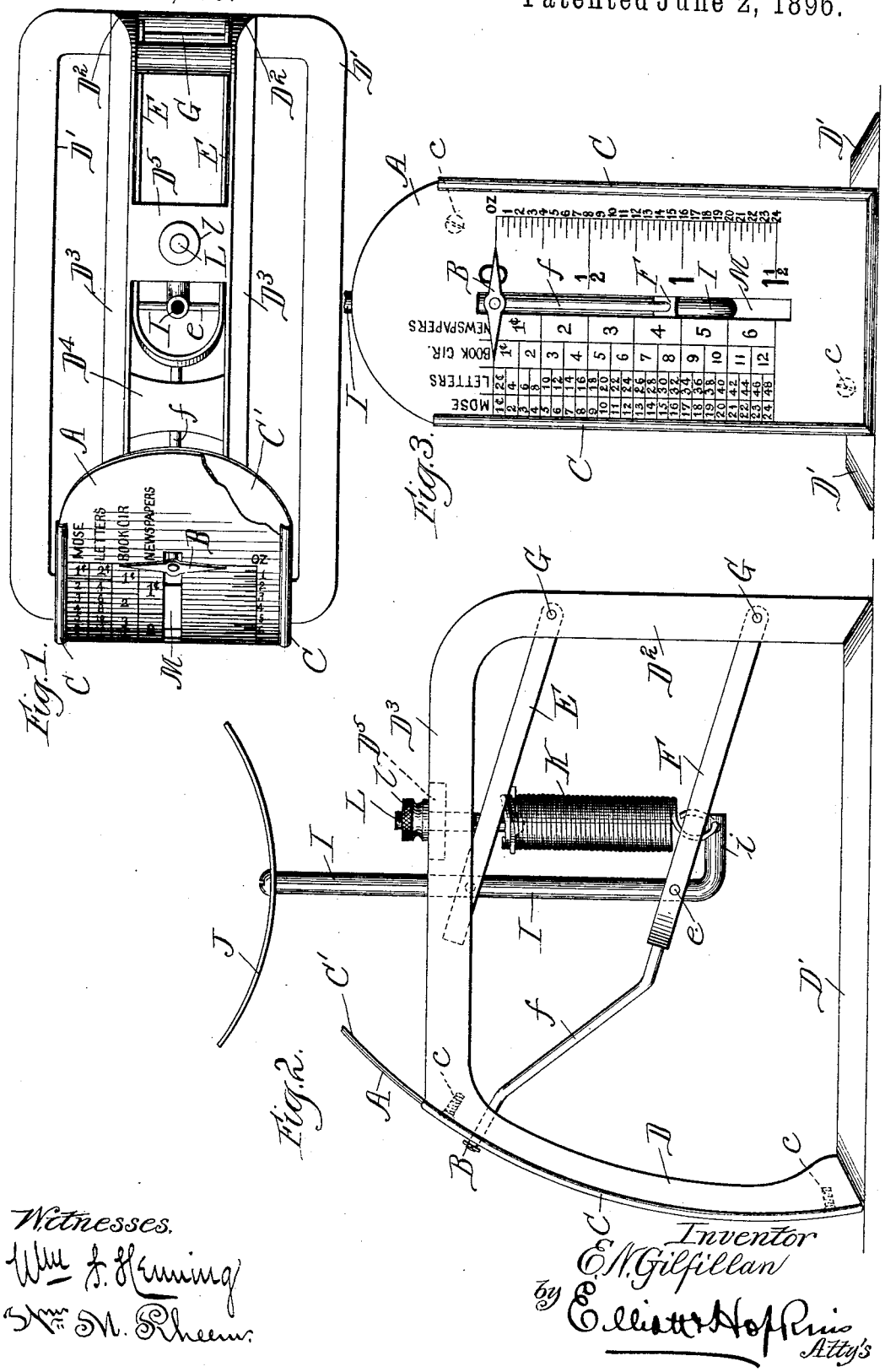

ESSINGTON N. GILFILLAN, OF CHICAGO, ILLINOIS, ASSIGNOR TO THE GILFILLAN SCALE AND HARDWARE COMPANY, OF SAME PLACE.

SPRING-BALANCE WEIGHING-SCALE.

SPECIFICATION forming part of Letters Patent No. 561,309, dated June 2, 1896.

Application filed April 17, 1894. Serial No. 507,865. (No model.)

*To all whom it may concern:*

Be it known that I, ESSINGTON N. GILFILLAN, a citizen of the United States, residing at Chicago, in the county of Cook and State of Illinois, have invented certain new and useful Improvements in Spring-Balance Weighing-Scales, of which the following is a full, clear, and exact specification.

This invention relates to and is designed as an improvement on that class of scales or balances more particularly employed for weighing letters and mail-matter, in which the scale-pan is supported above the balance or scale-plate or dial and its supporting-stem is connected to a rotating index or pointer by means of a rack and pinion.

In letter scales or balances it is desirable that the pan be arranged above all the other mechanism, so that there may be no restrictions as to the dimensions of the package or matter that may be supported thereon for weighing; but the rack-and-pinion connection between the pan and the index or pointer is objectionable on account of the excessive friction which it creates and which varies with the amount of dust, grease, or rust that may be between the parts. Hence the balance under such conditions is not reliable and is apt to be inaccurate.

The primary object of my invention therefore is to preserve the desirable superposed arrangement of the scale-pan as heretofore and reduce the amount of friction created by depressing the scale-pan to the minimum and to a certainty, and in addition to this to so curve and arrange the scale-plate that it will be in a convenient position for reading without requiring the user to stoop or to raise the scale to the level of his face, and at the same time to keep the height and length of the scale within the minimum dimensions.

My invention also has for its object to improve and simplify the construction generally and reduce the number of necessary parts.

With these ends in view my invention consists in certain features of novelty in the construction, combination, and arrangement of parts hereinafter more fully described with reference to the accompanying drawings, and particularly pointed out in the claims.

In the said drawings, Figure 1 is a plan view of my improved spring balance or scale with the scale-pan removed. Fig. 2 is a side elevation thereof, and Fig. 3 is a front view with the scale-pan and part of its support broken away.

Like signs of reference indicate like parts throughout the several views.

In carrying out my invention I employ an upright curved or bowed scale-plate, and I mount the index or pointer on one of a pair of parallel spring-actuated pivoted arms whose free or swinging ends are connected to and supported by the stem of the scale-pan, and which in turn hold such stem in an upright or vertical position, the graduated scale-plate being bowed on an arc concentric with the arc described by the said pivoted arm to which the index is secured.

A represents the graduated scale-plate, having the graduations or other desired scales indicated thereon in vertical rows or columns. In practice I prefer to have the index or pointer B rise and fall along a central line on the scale-plate and indicate the graduations representing weight on one side, while those representing the various classes of mail-matter or articles to be weighed and the amount of postage required thereon are indicated on the other side, the index being double-pointed, so as to point to the graduations on both sides at once, as shown.

The graduated scales may be printed or indicated on a separate piece and afterward slipped into and held in place by guide-flanges or beads C, formed along the side and bottom edges of the curved or bowed back plate C', the latter being secured to the forward members D of the frame by means of screws or rivets $c$, as shown in dotted lines in Figs. 2 and 3, and the screws being concealed by the front plate A, upon which the graduations are indicated.

The frame of the device is preferably a skeleton structure constructed, preferably, of pressed steel or brass and composed of the forward members D, the bottom rectangular portion D', which constitutes the base or pedestal of the device, the rear standards $D^2$, and the horizontal top portions $D^3$, connected together by cross members $D^4$ $D^5$, all, if desired, being cast in one piece.

The parallel arms E F are substantially U shape and have their rear extremities pivoted on rods or pins G extending between the standards D² of the frame, while their swinging or inner ends are pivoted to and supported by the stem I of the scale-pan J, the stem I in turn being supported by the coil-spring K, which depends from an adjustable bar L, passing through the cross member D⁵ of the frame and being supported thereon by the nut $l$, the connection between the spring and stem I being effected by providing the lower end of the stem with a crook or bend $i$, through a perforation in which one of the convolutions of the spring is passed. The stem I and the spring K are arranged between the side members of the arms E F, such members being a sufficient distance apart to permit the upper arm to descend without striking against or interfering with the spring. The pivotal connection between the stem I and arms E F may be effected by means of transverse rods or pins $e$. The lower one, F, of the pivoted arms is provided at its inner end with an extension $f$, upon the extremity of which the index or pointer B is secured, the scale-plate A, as well as the plate C', being provided with a vertical slot M for the passage of such projection, the projection being bent upwardly, as shown in Fig. 2, in order to hold the index in proper position with reference to the graduations on the scale-plate. By this arrangement it will be seen that the scale-pan J is held above the other mechanism, as heretofore, so that there may be no danger of the matter placed thereon coming into engagement with any obstructions while being weighed, and the entire weight is supported directly by the spring K, the arms E F being simply supported upon the stem I and having no other function than to hold such stem in a vertical position and communicate the movement thereof to the index or pointer B, and hence the only friction resulting from depressing the scale-pan is that which is caused by the weight of the arms E F on their pivots and the slight lateral pressure induced by the spring, which are both very slight, and inasmuch as the index or pointer is secured directly to one of these arms it will respond readily and accurately to the slightest movement of the scale-pan. It will also be seen that by bending the arm $f$ upwardly at an angle to the arm F, I am enabled to carry the index B to the extreme upper end of the curved scale-plate without carrying the arm F and the scale-pan to an extreme elevation, and at the same time I am enabled to employ a spring of sufficient length without unduly increasing the height of the frame upon which the spring is supported, and while this bend of the arm $f$ enables me to carry the index B to the extreme upper end of the scale-plate while keeping the lower end of the spring at a lower elevation it does not prevent the index from descending sufficiently far to reach the lower end of the scale, but permits the index to traverse that portion of the bowed scale-plate which is presented upward, so that the user may read it conveniently without stooping to the level of the device, the lower end of the scale on the scale-plate being arranged on a level with the horizontal diameter of the arc described by the index-arm, whereas it is readily seen that should the arm $f$ be a straight continuation of the arm F the graduated scale, in order to be of sufficient length, would have to be extended around the under side of the arc, and thus exclude the graduations from view.

I am aware that curved scale-plates have been used in combination with oscillating index-arms, but a scale of this kind is not the equivalent of my invention, inasmuch as the surface of my scale-plate is curved or cylindrical, whereas in said prior form the scale-plate is simply curved in the plane of its surface and is necessarily used in a vertical position and not in a position tipped or presented to the view of the user, as is my scale-plate.

Having thus described my invention, what I claim as new therein, and desire to secure by Letters Patent, is—

1. In a weighing scale or balance, the combination with a frame, a scale-pan, an oscillatory index-arm connected with said pan and means for yieldingly supporting said pan and arm, of a scale-plate having its surface curved in an arc concentric with the arc described by said arm, and an index secured transversely to said arm and projecting across said scale-plate, substantially as set forth.

2. In a weighing scale or balance, the combination with a frame, a scale-pan, an oscillatory index-arm connected to said scale-pan and means for yieldingly supporting said pan and arm, of a scale-plate provided with a longitudinal slot and having its surface curved in an arc concentric with the arc described by such index-arm, said index-arm projecting through said slot and carrying a transversely-arranged index extending across said scale-plate, substantially as set forth.

3. In a weighing scale or balance, the combination with a frame, a scale-pan and means for yieldingly supporting said pan, of a scale-plate having a cylindrical or curved surface, a pivoted oscillatory index-arm having an upwardly bent or angular extension carrying an index arranged transversely thereof across the face of said scale-plate and said arm being connected with said scale-pan and means for yieldingly supporting said arm, the surface of said scale-plate being presented upwardly or at an angle to the perpendicular, substantially as set forth.

4. In a weighing scale or balance, the combination with a frame, of a pair of spring-actuated arms pivoted in said frame, a scale-pan having a stem pivoted to said arms and projecting above said frame, an index carried by one of said arms, and a scale-plate having its surface curved on an arc concentric with the arc described by the arm carrying said index, substantially as set forth.

5. In a weighing scale or balance the combination with a frame a pan, a scale-plate secured thereto and having a slot therein, and a spring-actuated arm to which said pan is connected, pivoted to said frame, of an upwardly-bent extension on said arm projecting through said slot, and an index on said extension, said scale-plate having its surface bowed in an arc concentric with the arc described by such arm, substantially as set forth.

6. In a weighing scale or balance, the combination with a frame, a pivoted oscillatory index-arm connected to said scale-pan and means for yieldingly supporting said pan and arm, of a scale-plate provided with a longitudinal slot and having a cylindrical surface formed on an arc concentric with the arc described by said index-arm, and being provided on one side of said slot with characters indicating weight and on the other side with characters indicating money, said index-arm being projected through said slot, and a transversely-arranged index on the end of said index-arm, having two pointers projecting in opposite directions across said slot, substantially as set forth.

7. In a weighing scale or balance, the combination with a frame, a scale-pan, a pivoted oscillatory index-arm connected with said pan and means for yieldingly supporting said pan and arm, of a slotted scale-plate through which said index-arm protrudes, said scale-plate having a cylindrical surface bowed on an arc concentric with the arc described by said arm, the lower end of said scale being substantially level with the horizontal diameter of the said arc, and the said index-arm at a point between its outer end and the point of attachment with the said pan, being bent upwardly, substantially as and for the purpose set forth.

E. N. GILFILLAN.

Witnesses:
F. A. HOPKINS,
EDNA B. JOHNSON.